(12) United States Patent
Nishiguchi et al.

(10) Patent No.: US 7,924,125 B2
(45) Date of Patent: Apr. 12, 2011

(54) STOP LAMP SWITCH

(75) Inventors: Masayuki Nishiguchi, Toyota (JP);
Masao Okumura, Chiryu (JP); Yuji Sekitomi, Anjo (JP); Kyohei Manabe, Gifu (JP)

(73) Assignees: Toyota Jidosha Kabushiki Kaisha, Toyota-shi (JP); Matsuo Industries, Inc., Obu (JP)

( * ) Notice: Subject to any disclaimer, the term of this patent is extended or adjusted under 35 U.S.C. 154(b) by 250 days.

(21) Appl. No.: 12/297,757

(22) PCT Filed: Apr. 16, 2007

(86) PCT No.: PCT/IB2007/001021
§ 371 (c)(1),
(2), (4) Date: Oct. 20, 2008

(87) PCT Pub. No.: WO2007/119169
PCT Pub. Date: Oct. 25, 2007

(65) Prior Publication Data
US 2009/0237189 A1    Sep. 24, 2009

(30) Foreign Application Priority Data
Apr. 18, 2006   (JP) ................................ 2006-114976

(51) Int. Cl.
*H01H 1/66*   (2006.01)
(52) U.S. Cl. .................... 335/205; 335/152; 335/206
(58) Field of Classification Search .......... 335/151–154, 335/205–207; 200/84 C; 338/32 R, 32 H
See application file for complete search history.

(56) References Cited

U.S. PATENT DOCUMENTS

| | | | | |
|---|---|---|---|---|
| 3,200,645 A | * | 8/1965 | Levins | 73/313 |
| 3,243,544 A | | 3/1966 | Mayer | |
| 3,419,695 A | * | 12/1968 | Dinkelkamp et al. | 200/84 R |
| 3,437,771 A | * | 4/1969 | Henry | 200/84 C |
| 3,681,724 A | * | 8/1972 | Shepard | 335/207 |
| 3,701,064 A | | 10/1972 | Kinoshita et al. | |
| 3,826,139 A | * | 7/1974 | Bachman | 73/311 |
| 3,976,963 A | * | 8/1976 | Kubler | 335/206 |
| 4,064,755 A | * | 12/1977 | Bongort et al. | 73/313 |
| 4,135,137 A | * | 1/1979 | Thomas | 335/206 |
| 4,186,419 A | * | 1/1980 | Sims | 361/178 |
| 4,384,184 A | * | 5/1983 | Alvarez | 200/84 C |
| 4,543,569 A | | 9/1985 | Karlstrom | |
| 4,628,162 A | * | 12/1986 | Reinartz et al. | 200/84 C |
| 4,805,066 A | * | 2/1989 | Mergenthaler | 361/178 |
| 4,976,146 A | * | 12/1990 | Senghaas et al. | 73/313 |

(Continued)

FOREIGN PATENT DOCUMENTS

DE    1 127 957    4/1962

(Continued)

*Primary Examiner* — Ramon M Barrera
(74) *Attorney, Agent, or Firm* — Oblon, Spivak, McClelland, Maier & Neustadt, L.L.P.

(57) ABSTRACT

A stop lamp switch including: an enclosure; a reed switch disposed in the enclosure; a magnet, disposed in the enclosure, a magnetic field of which opens and closes the contacts of the reed switch; an actuating shaft that is movable along an axial direction of the enclosure; a blocking member provided on the actuating shaft, that moves with the movement of the actuating shaft, between a first position, at which the magnetic field from the magnet directed toward the first reed switch is blocked, and a second position, at which the blocking of the magnetic field from the magnet directed toward the first reed switch is no longer blocked.

10 Claims, 15 Drawing Sheets

U.S. PATENT DOCUMENTS

| | | | | |
|---|---|---|---|---|
| 5,025,827 | A | * | 6/1991 | Weng .................. 137/392 |
| 5,347,864 | A | * | 9/1994 | Senghaas et al. ........... 73/313 |
| 6,998,552 | B1 | * | 2/2006 | Li ........................ 200/84 C |

FOREIGN PATENT DOCUMENTS

| | | |
|---|---|---|
| DE | 201 13 027 | 11/2001 |
| FR | 2 057 538 | 5/1971 |
| FR | 2 872 767 | 1/2006 |
| GB | 1 173 035 | 12/1969 |
| GB | 2 255 673 A | 11/1992 |
| JP | 48 32867 | 4/1973 |
| JP | 52 106576 | 8/1977 |
| JP | 52 143669 | 10/1977 |
| JP | 55 109320 | 8/1980 |
| JP | 61 6457 | 1/1986 |
| JP | 62 104337 | 7/1987 |
| JP | 4 136829 | 12/1992 |
| JP | 10 64360 | 3/1998 |
| JP | 11 67035 | 3/1999 |
| JP | 2004 71452 | 3/2004 |
| JP | 2006 92777 | 4/2006 |

* cited by examiner

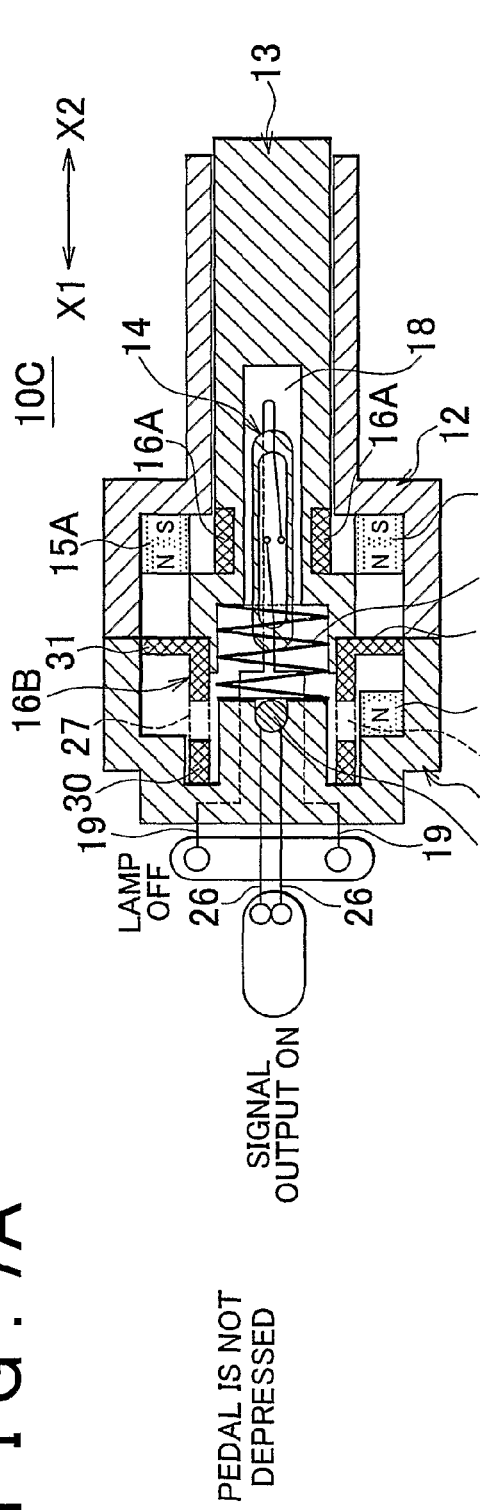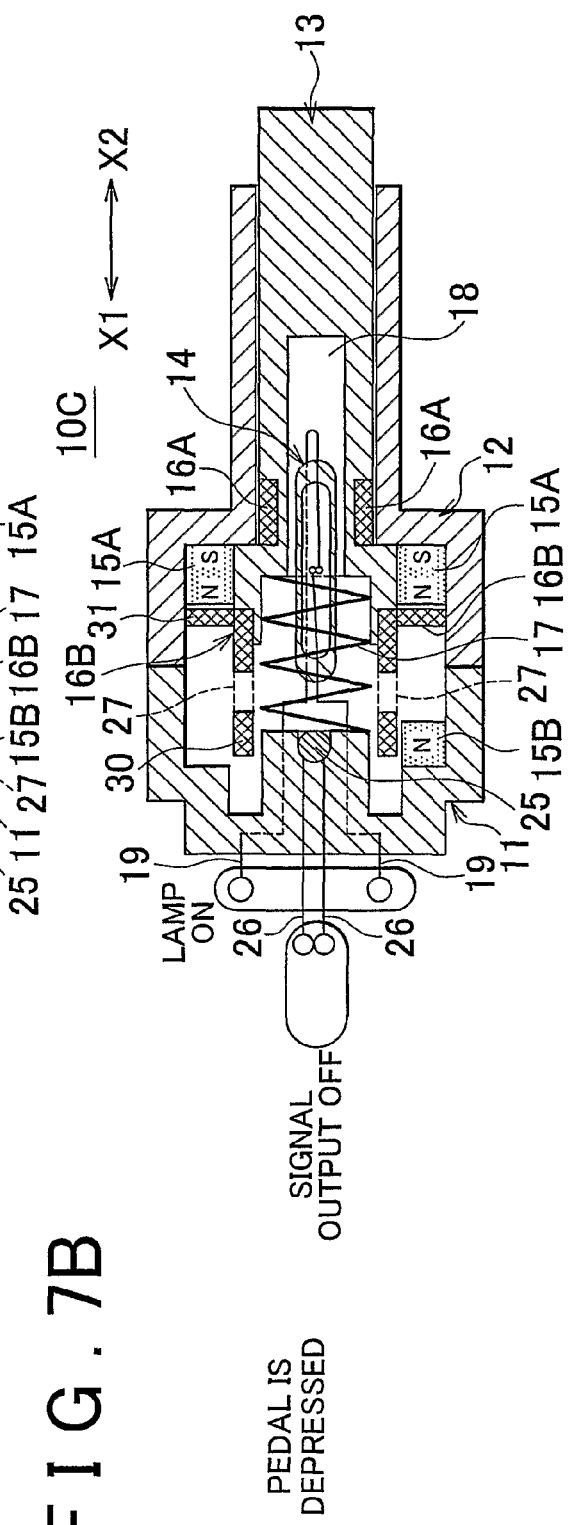

F I G . 9
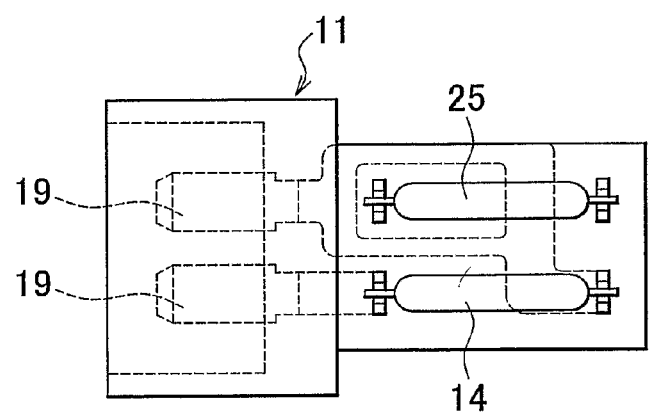

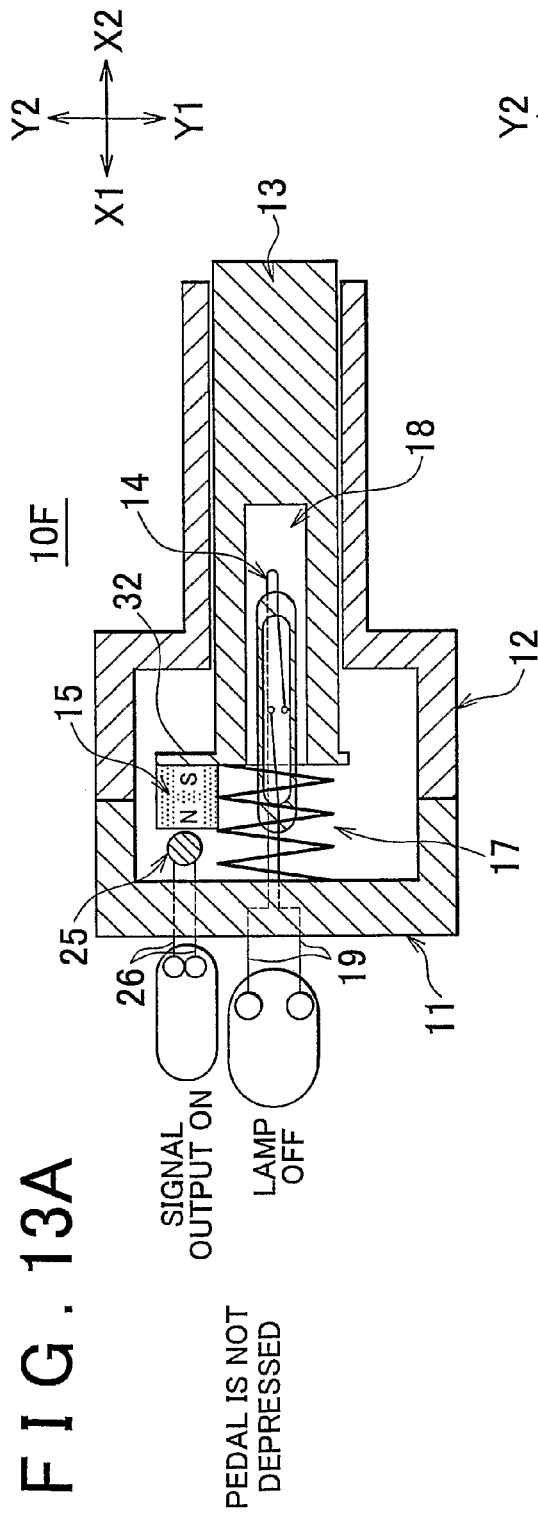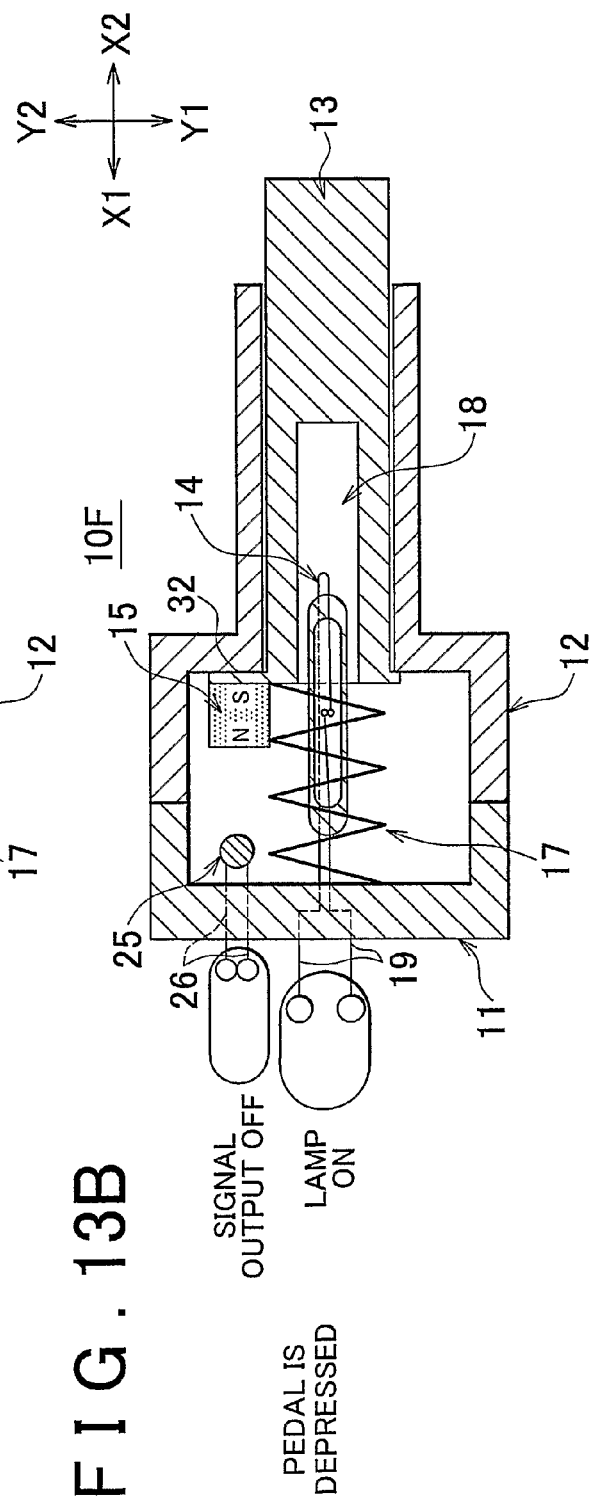

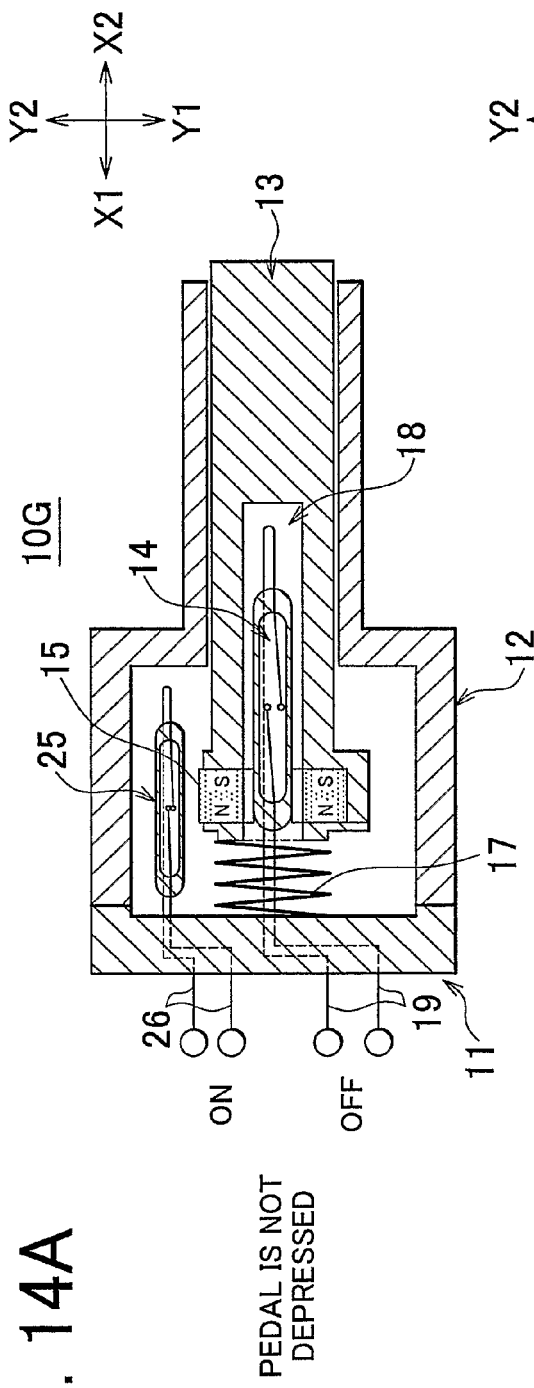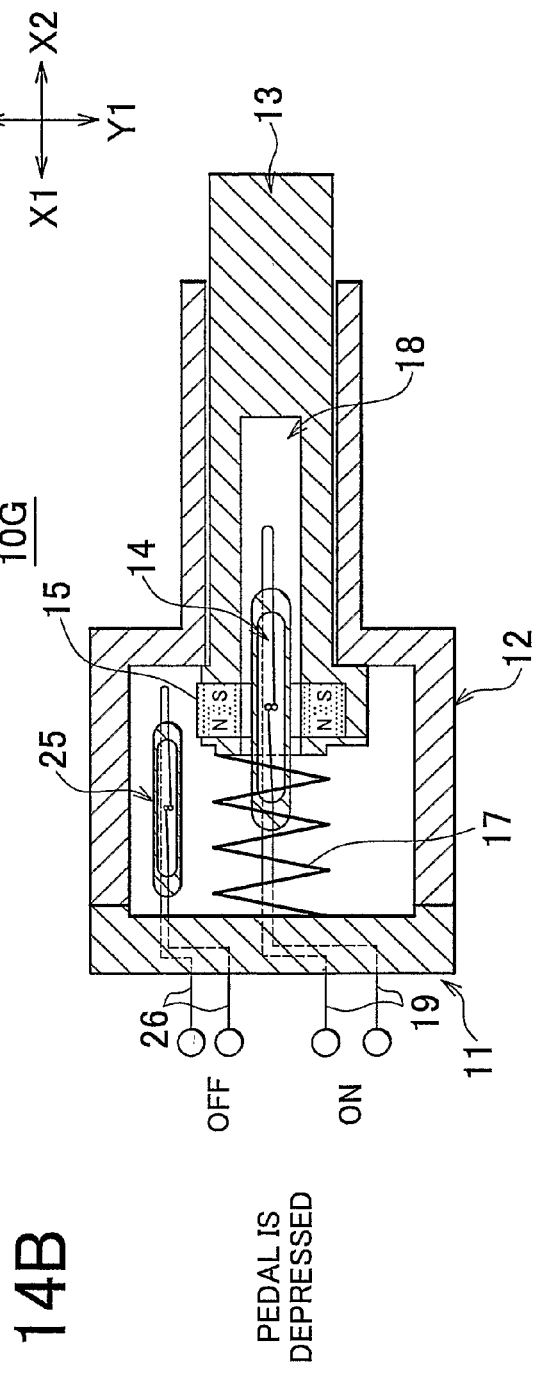

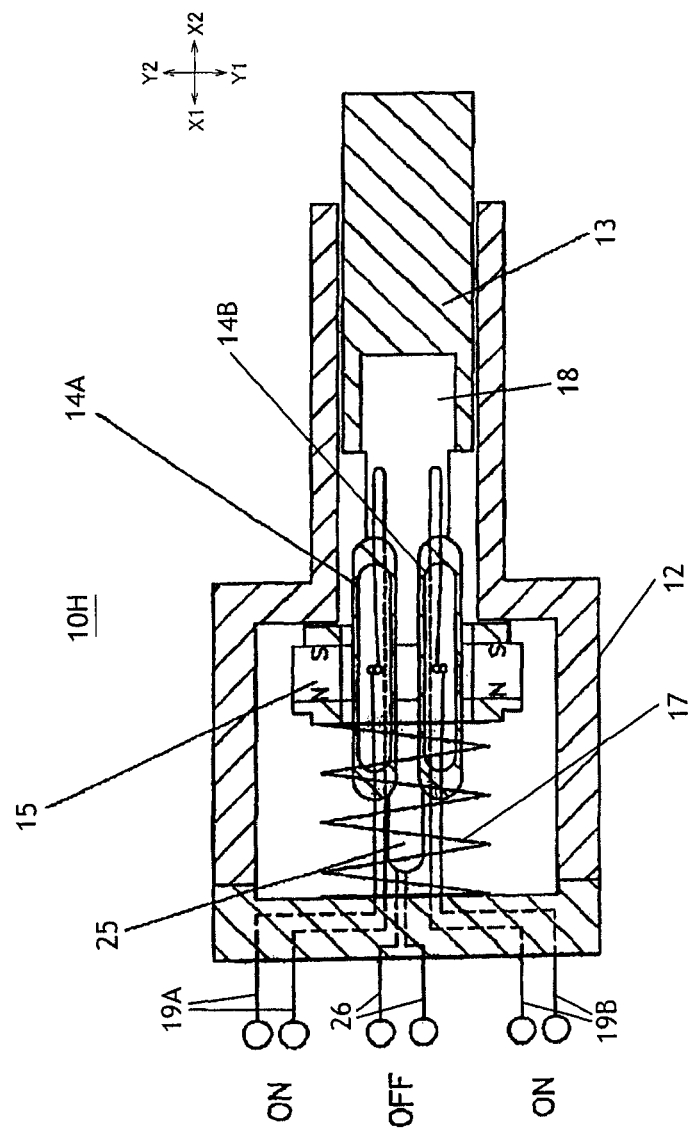
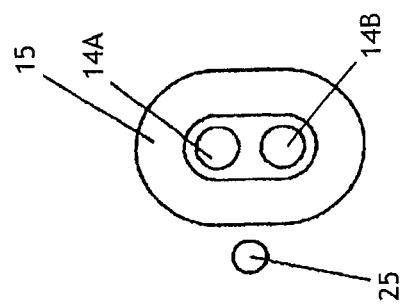
FIG. 16B
FIG. 16A

STOP LAMP SWITCH

BACKGROUND OF THE INVENTION

1. Field of the Invention

The present invention relates to a stop lamp switch and particularly to a stop lamp switch that opens and closes contacts with movement of an actuating shaft.

2. Description of the Related Art

Brake lamps are generally provided in vehicles to signal vehicles behind the vehicle that braking is done. These brake lamps are lighted and extinguished by opening and closing contacts provided in a stop lamp switch operated by a brake pedal.

In a conventional stop lamp switch, the actuating shaft is linked to and moves in concert with a brake pedal, a case that movably holds the actuating shaft, a fixed contact provided in the case, and a movable contact provided on the actuating shaft that makes connection with the fixed contact with movement of the actuating shaft when the brake pedal is depressed. If dust or oil becomes attached between the fixed contact and the movable contact, it is not possible to establish proper electrical conduction between the contacts.

To prevent dust or oil from becoming between the fixed contact and the movable contact Japanese Patent Application Publication No. JP-A-2004-0714512 describes disposing a sealing member between the case and the actuated contacts. The sealing member is formed of an elastic material, such as rubber or elastomer, and is configured to enable displacement accompanying the movement of a sliding member. Because the fixed contact and the movable contact are isolated from the outside by the sealing member, the configuration is one intended to prevent the attachment of dust and oil between the contacts.

However, because the sealing member covering the fixed contact and movable contact is made of an elastic material such as rubber and because it deforms with movement of the actuating shaft, if the sealing member deteriorates with the passage of time, the quality of its sealing against dust decreases, so that there is a risk of not providing reliable prevention of dust and the like becoming attached to the contacts. Also, it is possible that the deterioration of the sealing member with the passage of time can bring with it generation of dust from the sealing member, and attachment of the dust to the contacts can impede the proper operation of the contacts.

SUMMARY OF THE INVENTION

The present invention provides a stop lamp switch that is not easily susceptible to deterioration with the passage of time and that can provide proper contact operation.

Aspects of the present invention have the following means.

A first aspect of the present invention is a stop lamp switch having an enclosure; a reed switch disposed in the enclosure; a magnet disposed in the enclosure that generates a magnetic field for the purpose of opening and closing the contacts of the reed switch; an actuating shaft that is movable along one axis direction of the enclosure; and a blocking member provided on the actuating shaft that moves with the movement of the actuating shaft, between a first position, at which the magnetic field from the magnet directed toward the reed switch is blocked, and a second position, at which the magnetic field from the magnet directed toward the reed switch is not blocked.

A second aspect of the present invention is similar to the first aspect, except that the magnet is disposed to the outside relative to the blocking member, and the reed switch is disposed to the inside relative to the blocking member.

A third aspect of the present invention is similar to the first aspect, except that the magnet is disposed to the inside relative to the blocking member, and the reed switch is disposed to the outside relative to the blocking member.

A fourth aspect of the present invention is similar to the first to third aspects, except that multiple reed switches are provided at locations to which the magnetic field of the magnet reaches.

A fifth aspect of the present invention is similar to the first to fourth aspects, except that an aperture is formed in the blocking member and, when the blocking member is positioned at the second position, the aperture is opposite the contacts of the reed switch.

A sixth aspect of the present invention is similar to the first or second aspect, except that the actuating shaft covers the reed switch.

A seventh aspect of the present invention has an enclosure, a reed switch disposed within the enclosure, an actuating shaft that is movable along one axial direction of the enclosure, and a magnet that generates a magnetic field for the purpose of opening and closing the contacts of the reed switch and that moves with the movement of the actuating shaft, between a first position, at which a magnetic field is not applied to the reed switch, and a second position, at which the magnetic field is applied to the reed switch.

An eighth aspect of the present invention is similar to the seventh aspect, except that multiple reed switches are provided at locations to which the magnetic field of the magnet reaches A ninth aspect of the present invention is similar to the seventh or eighth aspect, except that the actuating shaft covers the reed switch.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein:

FIG. 7A and FIG. 7B are cross-sectional views of the configuration and operation of a stop lamp switch according to a second embodiment of the present invention;

FIG. 9 shows in enlarged form the case of a stop lamp switch according to the third aspect of the present invention with the blocking member removed;

FIG. 13A and FIG. 13B are cross-sectional views of the configuration and operation of a stop lamp switch according to a fifth embodiment of the present invention;

FIG. 14A and FIG. 14B are cross-sectional views of the configuration and operation of a variation of the stop lamp switch according to the fifth embodiment of the present invention;

FIG. 16A shows a rear perspective view of the stop lamp switch according to a variation of the fifth embodiment of the present invention; and FIG. 16B is a cross-sectional view of the configuration and operation of a variation of the stop lamp switch according to the fifth embodiment of the present invention.

DETAILED DESCRIPTION OF THE PREFERRED EMBODIMENTS

Specific forms that embody the present invention are described below, with references made to the accompanying drawings.

Figure 1A:
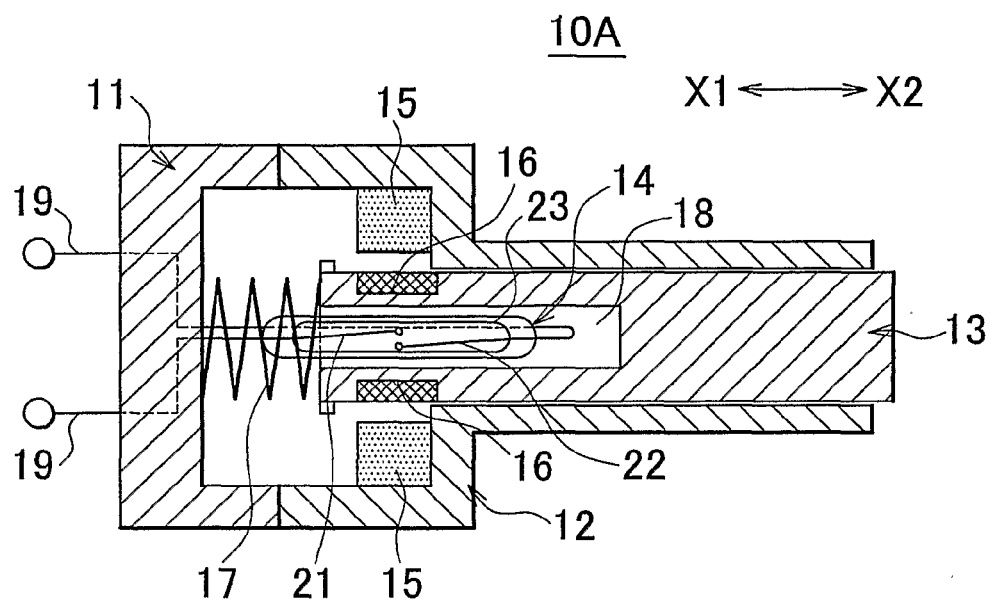
FIG. 1A and FIG. 1B are drawings that depict the basic configuration of a stop lamp switch according to an embodiment of the present invention.
Figure 1B:
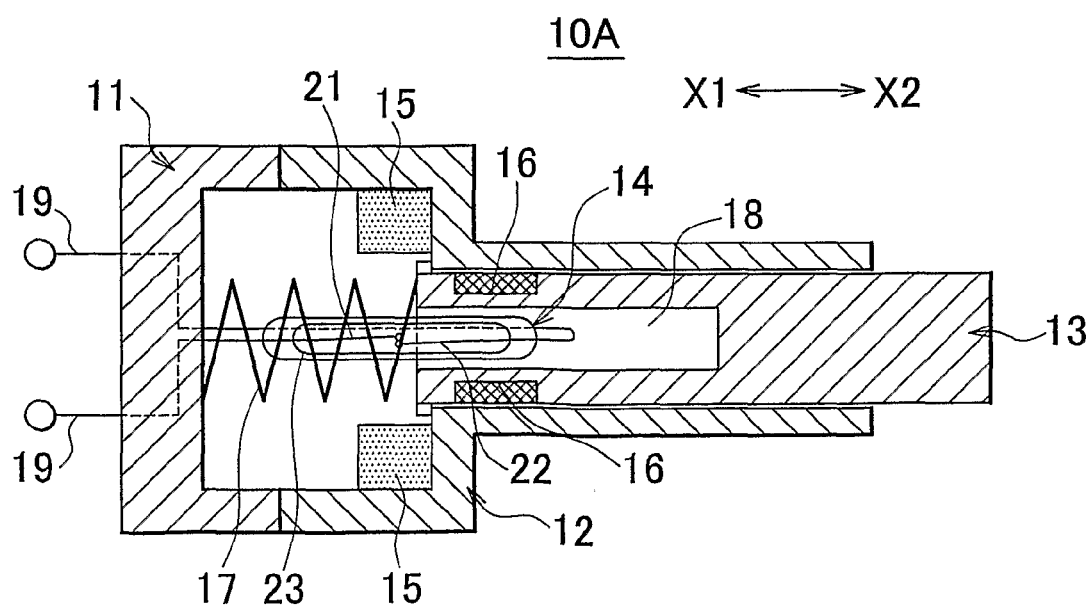

FIG. 1A and FIG. 1B are drawings depicting the principle of a stop lamp switch according to an embodiment of the present invention. FIG. 1A shows the condition of a stop lamp switch 10A when the brake pedal is not depressed (pedal non-operated condition) and FIG. 1B shows the condition of the stop lamp switch 10A when the brake pedal is depressed (pedal operated condition).

The stop lamp switch 10A generally has a case (enclosure) 11, a housing 12, an actuating shaft 13, a reed switch 14, a magnet 15, and a blocking member 16 and the like. The stop lamp switch 10A is disposed to make contact with the brake pedal, and the actuating shaft 13 follows the movement of the brake pedal as the brake pedal is depressed and released, thereby switching the reed switch 14 on and off to light and extinguish a stop lamp.

An internal space is formed by combining the case 11 and the housing 12. The reed switch 14 and connector terminals 19 are disposed in the case 11, and the actuating shaft 13 and the magnet 15 are disposed in the housing 12.

The reed switch 14 has reeds 21 and 22 inside a glass tube 23. Part of each reed 21 and 22 extends to outside the glass tube 23 and is connected to a connector terminal 19. The connector terminals 19 are connected to stop lamp drive circuit (not illustrated) that causes the stop lamp to light up.

The actuating shaft 13 is movably mounted in the housing 12 in the direction indicated by the arrows X1 and X2 in drawing. A housing space 18 opening in the X1 direction is provided in the actuating shaft 13. The reed switch 14 is positioned within the housing space 18. The size of the housing space 18 is established so that even if the actuating shaft 13 moves in the X1 and X2 directions accompanying movement of the brake pedal, there is no influence on the reed switch 14. The actuating shaft 13 is constantly impelled in the direction of arrow X2 by a spring 17.

The magnet 15 is disposed in the housing 12 to sandwich the reed switch 14 with N and S poles in opposition. Therefore, when the blocking member 16 is not present between the reed switch 14 and the magnet 15, the magnetic field generated by the magnet 15 acts on the reeds 21 and 22 within the glass tube 23, so that the reeds 21 and 22 make contact and go into the conducting condition.

The blocking member 16 is a cylindrical member made of a magnetic material capable of blocking a magnetic field, and is disposed on the actuating shaft 13. Thus, the blocking member 16 moves in the X1 and X2 directions with the movement of the actuating shaft 13.

When the brake pedal is not operated, the actuating shaft 13 shown in FIG. 1A moves in the direction of the arrow X1 and the blocking member 16 moves to a position between the reed switch 14 and the magnet 15 (first position). Thus, the blocking member 16 blocks the magnetic field of the magnet 15 so that the magnetic field does not act on the reed switch 14. For this reason, the reed switch 14 is in the off (open) condition, and the stop lamp is in the extinguished condition.

In contrast, when the brake pedal is operated, the actuating shaft 13 moves in the direction of the arrow X2 by the force of the spring 13, which also moves the blocking member 16 in the X2 direction. For this reason, as shown in FIG. 1B, the blocking member 16 moves away from between the reed switch 14 and the magnet 15, and to a position that allows the reed switch 14 and the magnet 15 to come into direct opposition (second position). The magnetic field of the magnet 15 therefore acts on the reed switch 14 and the reed switch 14 goes into the on (closed) condition. For this reason, the stop lamp is lighted via the stop lamp drive circuit connected to the connector terminals 19.

The stop lamp switch 10A according to the foregoing embodiment uses a reed switch as the contacts, so that other members do not come into contact with the reeds 21 and 22, the on/off operation of the contacts being made in a non-contacting manner. The contacts of the reeds 21 and 22 are sealed within the glass tube 23.

For this reason, in the stop lamp switch 10A according to this embodiment, unlike conventional switches, there are no moving parts at the sealed part protecting the contacts so that no damage occurs to the sealed part. Also, because the reed switch 14 contacts are disposed within the glass tube 23, the interior of which is either a vacuum or filled with an inert gas, impurities do not enter the glass tube 23. It is therefore possible to achieve a stop lamp switch 10A having improved reliability and long life.

By providing a housing space 18 in the actuating shaft 13 and adopting a configuration in which the reed switch 14 is inserted into the a housing space 18, it is possible to reduce the length of the stop lamp switch 10A in the direction of arrows X1 and X2 than a configuration in which the reed switch 14 is not inserted.

Specifically, it is possible to shorten the stop lamp switch 10A by the distance the reed switch 14 is inserted into the actuating shaft 13. By doing this, it is possible to improve the ease of mounting to the brake pedal installation location, which is generally in cramped quarters. Also, the operating effect of the stop lamp switch 10A shown in FIG. 1A and FIG. 1B can be achieved by the stop lamp switches 10B to 10F according to embodiments of the present invention to be described below.

Stop lamp switches 10B to 10F according to embodiments of the present invention and based on the above-described principle will now be described. FIG. 2 to FIG. 13B show stop lamp switches 10B to 10F according to the first to fifth embodiments of the present invention. In FIG. 2 to FIG. 13B, the same or corresponding elements as in FIG. 1A and FIG. 1B are assigned the same reference numerals and will not be repeated described herein.

Figure 2:
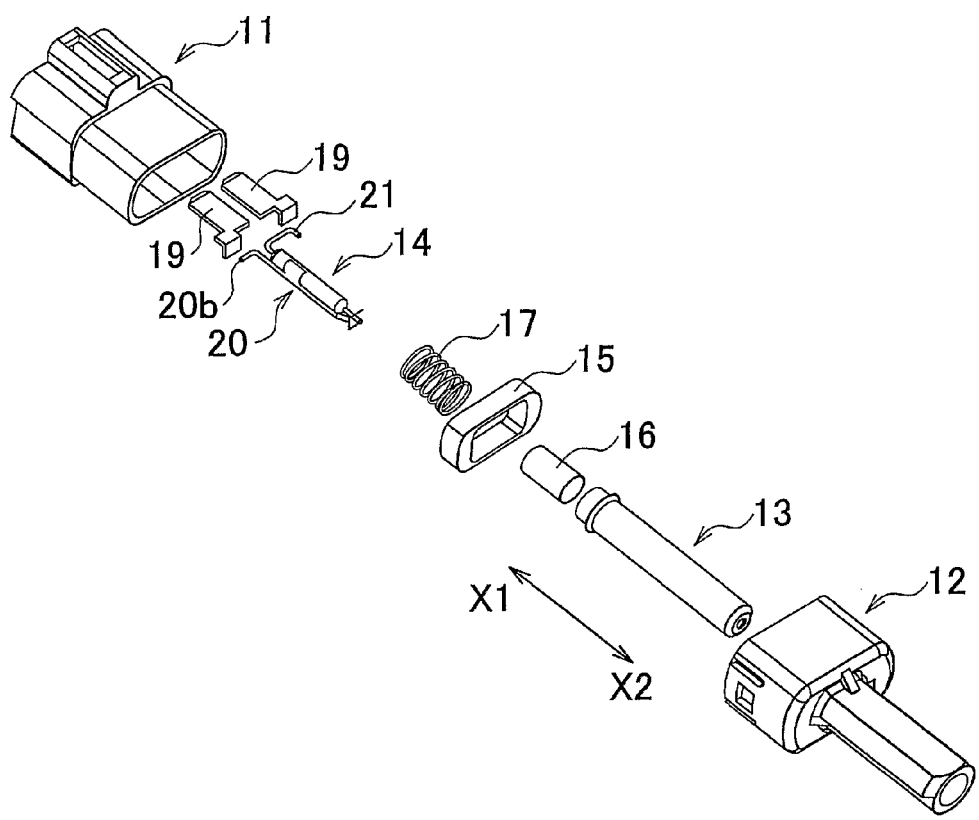
FIG. 2 is an exploded perspective view of a stop lamp switch according to a first embodiment of the present invention.
Figure 3:
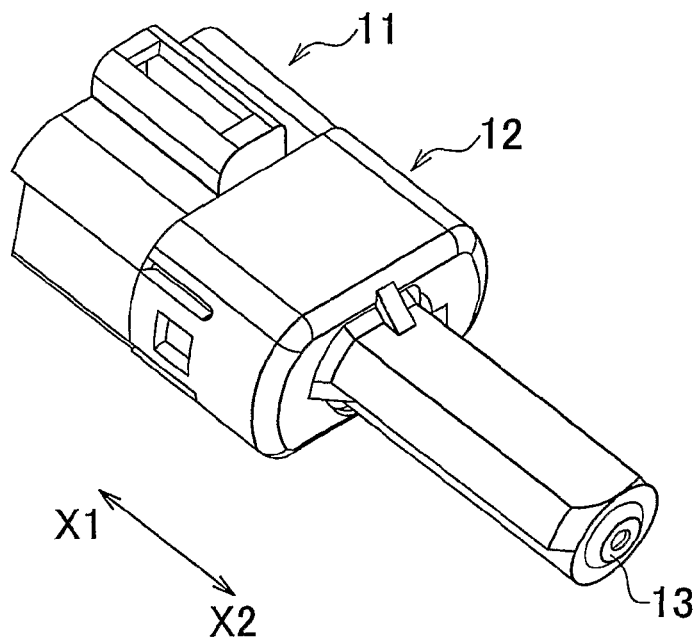
FIG. 3 is a perspective view showing the assembled condition of a stop lamp switch according to the first embodiment of the present invention.
Figure 4:
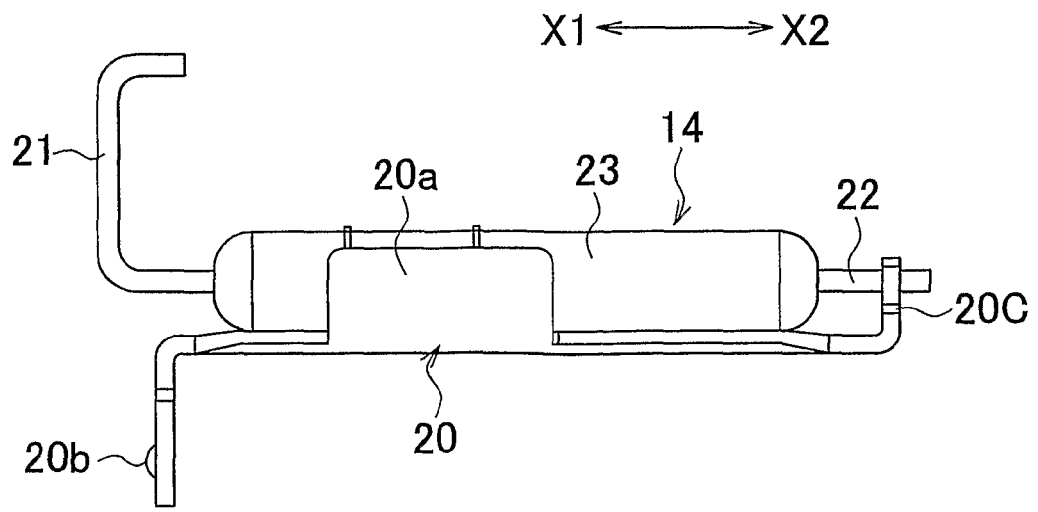
FIG. 4 is a side view of the reed switch and the terminals.
Figure 5:
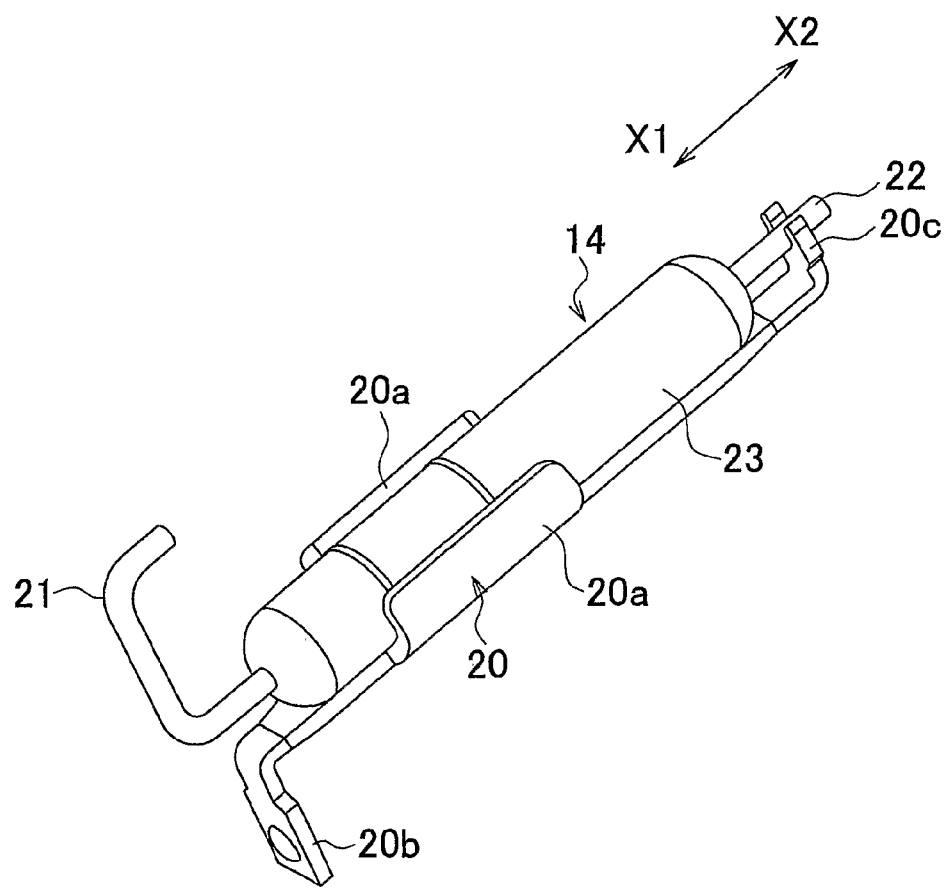
FIG. 5 is a perspective view of the reed switch and the terminals.

The stop lamp switch 10B according to the first embodiment of the present invention will first be described, with reference made to FIG. 2 to FIG. 6C. As shown in FIG. 2, a pair of connector terminals 19 is inserted into and integrally with the case 11 (these being shown separated from the case 11 in the drawings). The reed switch 14 is connected to the pair of connector terminals 19. FIG. 4 and FIG. 5 show enlarged views of the reed switch 14. In this embodiment, the reed switch 14 is mounted on a terminal 20.

The terminal 20 is made of an electrically conductive material, and is integrally formed with a holding member 20a, a terminal part 20b, and a connecting part 20c. The holding member 20a sandwiches the glass tube 23 to hold the reed switch 14.

When this is done, the position of the holding member 20a is established at a position that is offset from the contacts disposed inside the glass tube 23. By doing this, it is possible to apply the magnetic field of the magnet 15 to the contacts (reeds 21 and 22) inside the glass tube 23, without being hindered by the terminal 20.

The connecting part 20c, which extends outside of the glass tube 23 in the direction of arrow X2, is connected to the reed 22 of the reed switch 14. The terminal part 20b is bent into an L-shape and is electrically connected to the connector terminals 19. The reed 21 of the reed switch 14 that extends in the X1 direction is also bent into an L-shape and electrically connected to a connector terminal 19.

The magnet 15 is substantially ring shaped, and is fixed to the housing 12 by pressing it into the housing 12. The magnet 15 is disposed at outside of the reed switch 14. The blocking member 16 is cylindrically shaped and is pressed into the actuating shaft 13. A housing space 18 is formed in the actuating shaft 13 and the terminal 20 (including the reed switch 14) may be inserted into the housing space 18.

In the stop lamp switch 10B, because the connector terminals 19 are formed so as to be inserted into the case 11, the reed switch 14 is held by the terminal 20, the magnet 15 is fixed to the housing 12 by pressing thereinto, and the blocking member 16 is pressed into the actuating shaft 13, it is possible to facilitate assembly. Also, as shown in FIG. 3, the assembled stop lamp switch 10B is compact, making it easy to mount to the brake pedal installation location.

Figure 6A:
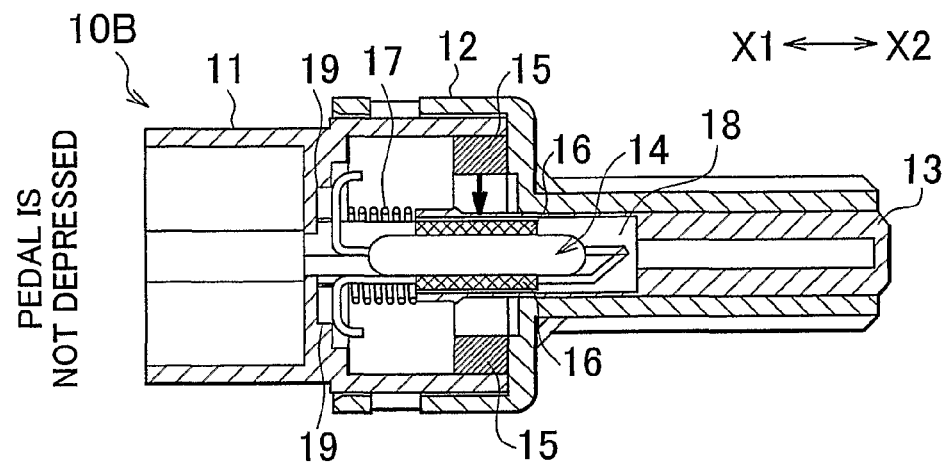
FIG. 6A to FIG. 6C are drawings that depict the operation of a stop lamp switch according to the first embodiment of the present invention.
Figure 6B:
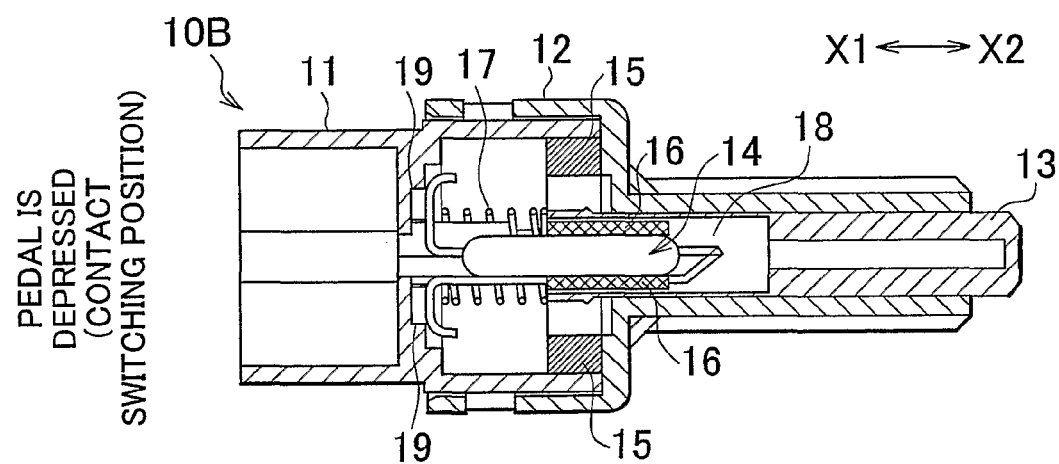
Figure 6C:
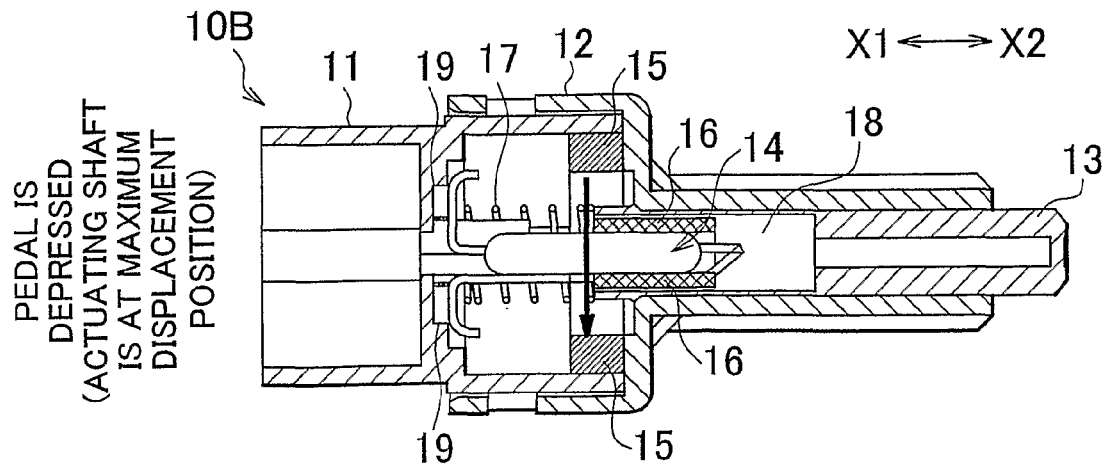

FIG. 6A to FIG. 6C depict the operation of the stop lamp switch 10B. FIG. 6A shows the stop lamp switch 10B when the brake pedal is not operated. The actuating shaft 13, in opposition to the force of the spring 17, is moved in the direction of the arrow X1 in the drawing by the brake pedal, and in this condition the blocking member 16 provided in the actuating shaft 13 is positioned between the magnet 15 and the reed switch 14.

For this reason, the blocking member 16 blocks the magnetic field of the magnet 15, so that the magnetic field does not act on the reed switch 14. The reed switch 14 therefore goes into the off (open) condition, and the stop lamp is in the extinguished condition. In this condition, the reed switch 14 is inserted the most deeply into the housing space 18.

FIG. 6B shows the condition in which the brake pedal starts to be depressed, whereby the actuating shaft 13 moves in the direction of the arrow X2 by the force of the spring 17 to the position at which the contacts are switched. The contact switching position is the limiting position at which the blocking member 16 can block the magnetic field generated by the magnet 15. If the pedal is depressed further from this condition, the actuating shaft 13 moves beyond the contact switching position in the direction of the arrow X2.

As shown in FIG. 6C, when the brake pedal is depressed the actuating shaft 13 is moved in the direction of the arrow X2. In this condition, the blocking member 16 is removed from the position between the reed switch 14 and the magnet 15, so that the reed switch 14 and the magnet 15 are in direct opposition. Thus, the magnetic field of the magnet 15 (indicated by the downward-pointing arrow in the drawing) acts on the reed switch 14, and the stop lamp is lighted via the stop lamp drive circuit connected to the connector terminals 19.

The stop lamp switch 10C according to the second embodiment of the present invention will now be described.

FIG. 7A and FIG. 7B show the stop lamp switch 10C according the second embodiment of the present invention. A feature of the stop lamp switch 10C of the second embodiment is that it has two reed switches 14 and 25, two blocking members 16A and 16B, and two magnets 15A and 15B. The reed switch 14 is used to turn the brake lamp on and off, as in the case of the first embodiment.

The reed switch 25, in contrast, functions as a brake switch that detects the operation of the brake pedal. As described later, the reed switch 25 is on (closed) when the brake pedal is not depressed, and off (open) when the brake pedal is depressed.

The reed switch 25 is connected to the connector terminals 26, and the connector terminals 26 are connected, for example, to an engine control unit (ECU). The ECU detects the depression of the brake pedal by a brake signal sent from the reed switch 25. In this embodiment the reed switch 25 is mounted on the case 11 in a direction perpendicular to the plane of the drawing, in order to prevent an increase in size in the directions of the arrows X1 and X2.

The first magnet 15A is formed substantially the same as the magnet 15 of the stop lamp switch 10B in the first embodiment. That is, the first magnet 15A is disposed in the housing 12 opposite the reed switch 14. In contrast, the second magnet 15B is fixed to the case 11 opposite the reed switch 25. The position of the second magnet 15B is established so that it is possible for the magnetic field of the second magnet 15B to act on the reed switch 25.

The first blocking member 16A is formed substantially the same as the blocking member 16 of the stop lamp switch 10C of the first embodiment. That is, the first blocking member 16A is fixed to the actuating shaft 13, and when the brake pedal is not operated, the actuating shaft 13 is moved in the X1 direction, (shown in FIG. 7A), and the actuating shaft 13 blocks the magnetic field of the magnet 15, thereby preventing the magnetic field from acting on the reed switch 14. When the brake pedal is depressed (shown in FIG. 7B), the actuating shaft 13 is moved in the X2 direction, and the first blocking member 16A moves away from between the first magnet 15A and the reed switch 14, thereby allowing the magnetic field of the magnet 15 to act on the reed switch 14.

In contrast to the above, the second blocking member 16B is made of a magnetic material that can block a magnetic field, and has a cylindrical part 30 and a flanged part 31. The second blocking member 16B may also be fixed to the actuating shaft 13, at a position that is farther in the X1 direction from the position where the first blocking member 16A is fixed.

An aperture 27 is formed at a prescribed position on the second blocking member 16B. The aperture 27 is formed so that, when the brake pedal is not depressed the actuating shaft 13 is moved in the X1 direction (shown in FIG. 7A), and the reed switch 25 and the second magnet 15B are in opposition. Therefore, when the brake pedal is not depressed the magnetic field of the second magnet 15B acts on the reed switch 25, so that the reed switch 25 is on.

In contrast, when the brake pedal is depressed, the actuating shaft 13 is moved in the X2 position (shown in FIG. 7B), and the second blocking member 16B is positioned between the reed switch 25 and the second magnet 15B; thus, blocking the magnetic field of the second magnet 15B and preventing the magnetic field from acting on the reed switch 25. In the pedal operated condition, therefore, the magnetic field of the second magnet 15B does not act on the reed switch 25, and the reed switch 25 is off.

According to the stop lamp switch 10C of the second embodiment, it is possible to extract two signals from the reed switches 14, 15 simultaneously. For this reason, it is possible to obtain two signal from a single stop lamp switch 10C. Also, by appropriately selecting the position of the aperture 27 in the second blocking member 16B, it is possible to have the reed switch 25 be in the on condition either in the pedal operated condition or the pedal non-operated condition, thereby increasing the degree of freedom in the setting of the stop lamp switch 10C.

The third embodiment of the present invention will now be described.

Figure 8C:
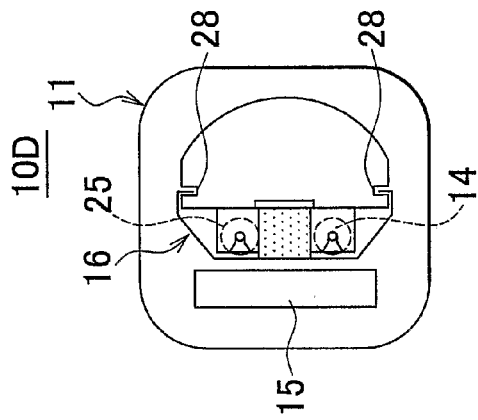
FIG. 8A to FIG. 8C show in enlarged form the region of the case of a stop lamp switch according to a third embodiment of the present invention.
Figure 8A:
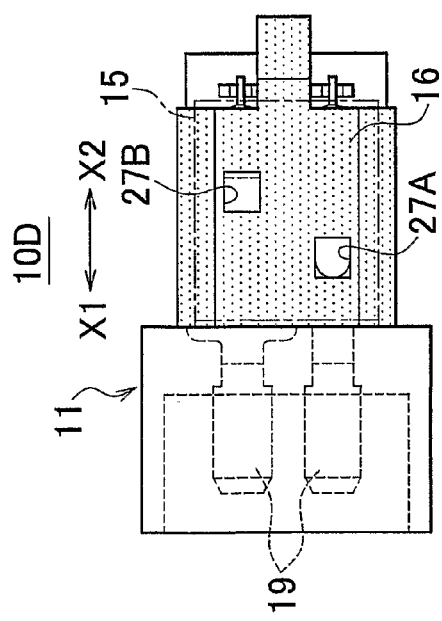
Figure 8B:
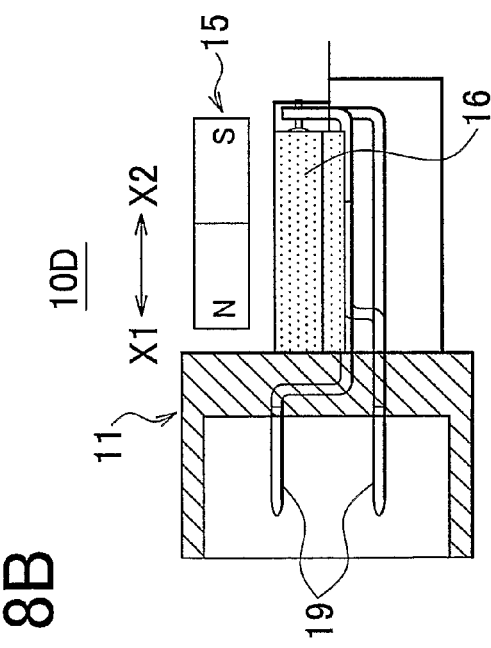

FIG. 8A to FIG. 9 show the stop lamp switch 10D according to the third embodiment of the present invention. FIG. 8A to FIG. 9 show in enlarged only the characteristic region of the case 11 of the stop lamp switch 10D, and descriptions of the housing 12 and description of the actuating shaft 13 will be omitted herein.

The case of the third embodiment is similar to that of the second embodiment, and has two reed switches 14, 25. The reed switches 14, 25, as shown in FIG. 9, are disposed in a parallel row in the case 11.

In this embodiment, one blocking member 16 is provided for both reed switches 14, 25. The magnet 15 has the form of a flat plate, and this magnet 15 is also provided in common for the reed switches 14, 25.

The blocking member 16 is moveable in the directions of the arrows X1 and X2 in the drawing, by means of the actuating shaft 13 (not illustrated). The side edges of the blocking member 16 are bent inward, as shown in FIG. 8C, the bent parts thereof are engaged with the case 11 to enable sliding in the guide grooves 28 formed in the case 11 and that extend in the X1 and X2 directions. The blocking member 16 can move in the directions of the arrows X1 and X2 relative to reed switches 14, 25 with the movement of the actuating shaft 13.

Apertures 27A and 27B are formed in the blocking member 16. The aperture 27A is formed to as to oppose the reed switch 14, and the aperture 27B is formed so as to oppose the reed switch 25. Specifically, when the brake pedal is not depressed (shown in FIG. 8A), the blocking member 16 (actuating shaft 13) is moved in the direction of the arrow X1, the aperture 27A moves away from the contact position of the reed switch 14, and the aperture 27B moves to a position opposite the contacts of the reed switch 25.

When the brake pedal is depressed, the blocking member 16 is moved in the direction of the arrow X2, and the aperture 27A is set at a position opposite the contacts of the reed switch 14 and the aperture 27B is set at a position that is removed from the position of the contacts of the reed switch 25. The magnetic field of the magnet 15 selectively act on the reed switch 14 and the reed switch 25.

In the stop lamp switch 10D having the above-noted configuration, when the brake pedal is not depressed the magnetic field of the magnet 15 acts on the reed switch 25 via the aperture 27B, so that the reed switch 25 is in the on (closed) condition. In contrast, the reed switch 14 is off (open) because the blocking member 16 blocks the magnetic field of the magnet 15.

On the other hand, when the brake pedal is depressed, the magnetic field of the magnet 15 acts on the reed switch 14 via the aperture 27A, so that the reed switch 14 is in the on (closed) condition. In contrast, the reed switch 25 is in the off (open) condition because the blocking member 16 blocks magnetic field of the magnet 15.

In the stop lamp switch 10D of the above-noted third embodiment of the present invention as well, it is possible obtain two signals simultaneously from the two reed switches 14, 25. Also, by appropriately selecting the position of the apertures 27A, 27B, it is possible to increase the degree of freedom in the setting of the stop lamp switch 10D. Additionally, because only one magnet 15 is required, there is a reduction in the number of parts in comparison with the stop lamp switch 10C of the second embodiment.

The fourth embodiment of the present invention will now be described.

Figure 10:
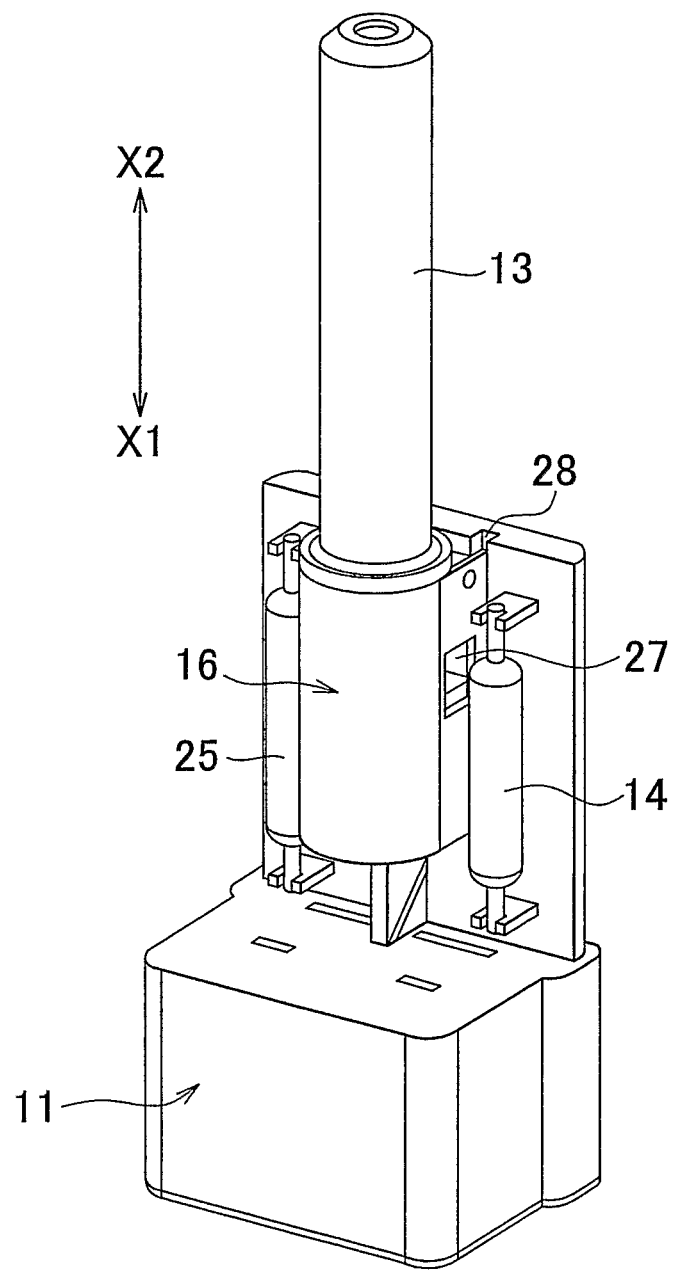
FIG. 10 is a perspective view, shown in enlarged form, of the region of the case of a stop lamp switch according to a fourth embodiment of the present invention.
Figure 11A:
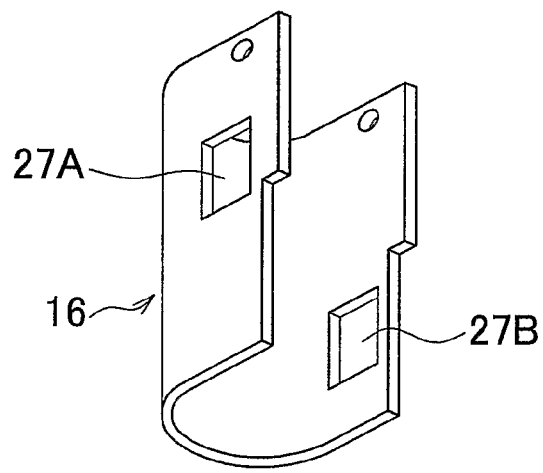
FIG. 11A and FIG. 11B are perspective views showing the blocking member provided in a stop lamp switch according to the fourth embodiment of the present invention.
Figure 11B:
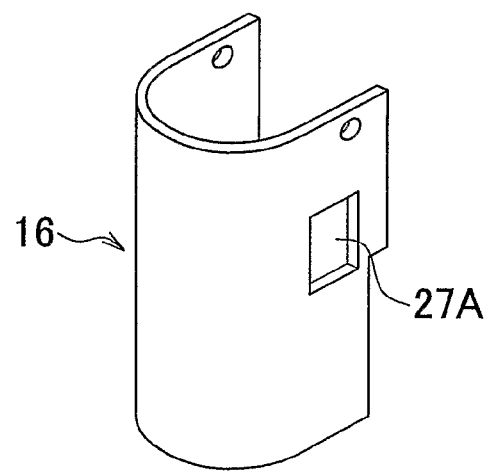
Figure 12:
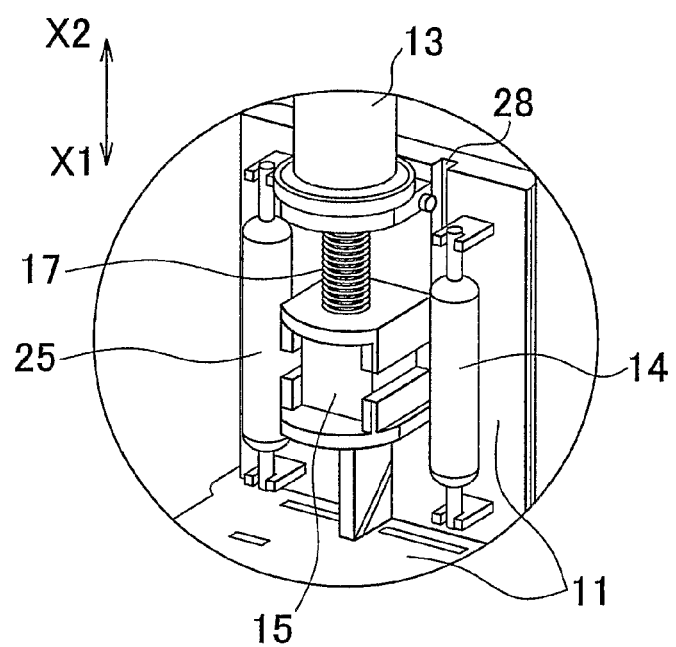
FIG. 12 is a perspective view showing in enlarged form the case of a stop lamp switch according to the fourth aspect of the present invention with the blocking member removed.

FIG. 10 to FIG. 12 are drawings for describing the stop lamp switch 10E according to the fourth embodiment of the present invention. FIG. 10 shows in enlarged the region of the case 11 of the stop lamp switch 10E, and the description of the housing 12 is omitted herein.

The stop lamp switch 10E of this embodiment, in addition to having the magnet 15 disposed to the inside of the blocking member 16, has the reed switches 14, 25 disposed the outside of the blocking member 16. FIG. 12 is an enlarged view of the region of the magnet 15 of the stop lamp switch 10E. As shown in this drawing, a single magnet 15 is disposed in the case 11, within the blocking member 16.

The blocking member 16, as shown in enlarged form in FIG. 11A and FIG. 11B, has a U-shaped profile, and is movable in the directions of the arrows X1 and X2, guided by the guide grooves 28 formed in the case 11. Because the blocking member 16 is fixed to the bottom end of the actuating shaft 13, blocking member 16 moves in the X1 and X2 directions with the movement of the actuating shaft 13 in the X1 and X2 directions.

Apertures 27A, 27B are formed in the blocking member 16 (refer to FIG. 11A). The positions at which the apertures 27A, 27B are formed so as to be equivalent to the positions of the apertures 27A, 27B described in the third embodiment.

In the stop lamp switch 10E, therefore, when the brake pedal is not depressed the magnetic field of the magnet 15 acts on the reed switch 25 via the aperture 27B, so that the reed switch 25 is in the on (closed) condition. In contrast, the reed switch 14 is in the off (open) condition, because the blocking member 16 blocks the magnetic field of the magnet 15.

On the other hand, when the brake pedal is depressed the magnetic field of the magnet 15 acts on the reed switch 14 via the aperture 27A, so that the reed switch 14 is in the on (closed) condition, while the reed switch 25 is in the off (open) condition because the blocking member 16 blocks the magnetic field of the magnet 15.

In this embodiment, by disposing the magnet 15 on the inside of the blocking member 16, it is possible with a compact magnet 15 to apply a magnetic field to the plurality of reed switches 14, 25, thereby enabling an improvement in the compactness of the stop lamp switch 10E. Also, because of the two reed switches 14, 25, it is possible to achieve the same type of effect as the second and third embodiments.

The fifth embodiment of the present invention will now be described.

FIG. 13A and FIG. 13B show a stop lamp switch 10F according to the fifth embodiment of the present invention.

While the foregoing described embodiments had blocking members 16, 16A, and 16B, this embodiment adopts a configuration in which the reed switches 14 and 25 contacts are switched on and off without using the blocking members 16, 16A, and 16B.

In this embodiment, the magnet 15 is provided on a flange part 32 formed on the end part of the actuating shaft 13 in the X1 direction. Therefore, the magnet 15 moves in the X1 and X2 directions with the movement of the actuating shaft 13 in the X1 and X2 directions. Also, the reed switch 25 is disposed in the case 11, similar to the other embodiment, but is disposed at a position that is opposite the magnet 15 (in the X1 and X2 direction).

When the brake pedal is not depressed, therefore, the actuating shaft 13 is moved in the X1 direction, as shown in FIG. 13A, and the magnet 15 approaches the reed switch 25, so that the magnetic field of the magnet 15 acts on the reed switch 25, causing it to be in the on (closed) condition. In contrast, when the brake pedal is depressed, the actuating shaft 13 is moved in the X2 direction, as shown in FIG. 13B, and the magnet 15 moves away from the reed switch 25, so that the magnetic field of the magnet 15 does not act on the reed switch 25, causing the reed switch 25 to be in the off (open) condition.

The reed switch 14 is configured so that it can be inserted into the housing space 18 formed in the actuating shaft 13. The magnet 15 is provided on the end part in the X1 direction of the actuating shaft 13. When the brake pedal is not depressed, therefore, as shown in FIG. 13A, most of the reed switch 14 is inside the housing space 18, and the magnetic field of the magnet 15 does not act on the contacts of the reed switch 14. The reed switch 14, therefore, is in the off (open) condition when the brake pedal is not depressed.

In contrast to this, when the actuating shaft 13 is moved in the X2 direction by the depressing of the brake pedal, the magnet 15 also moves in concert in the X2 direction. By moving the actuating shaft 13 in the X2 direction, the reed switch 14 that is fixed to the case 11 moves out of the housing space 18 so as to be exposed.

When the brake pedal is depressed, as shown in FIG. 13B, the magnet 15 is opposite the reed switch 14 (when considered in the Y1, Y2 direction). Therefore, when the brake pedal is depressed, the reed switch 14 is closed.

As noted above, the stop lamp switch 10F of this embodiment is able to switch the reed switches 14, 25 on and off by a single magnet 15, without using blocking members. It is therefore possible to reduce the number of parts compared to the other embodiments, to facilitate assembly, and to achieve compactness.

A variation of the embodiment of the present invention will now be described.

Figure 15:
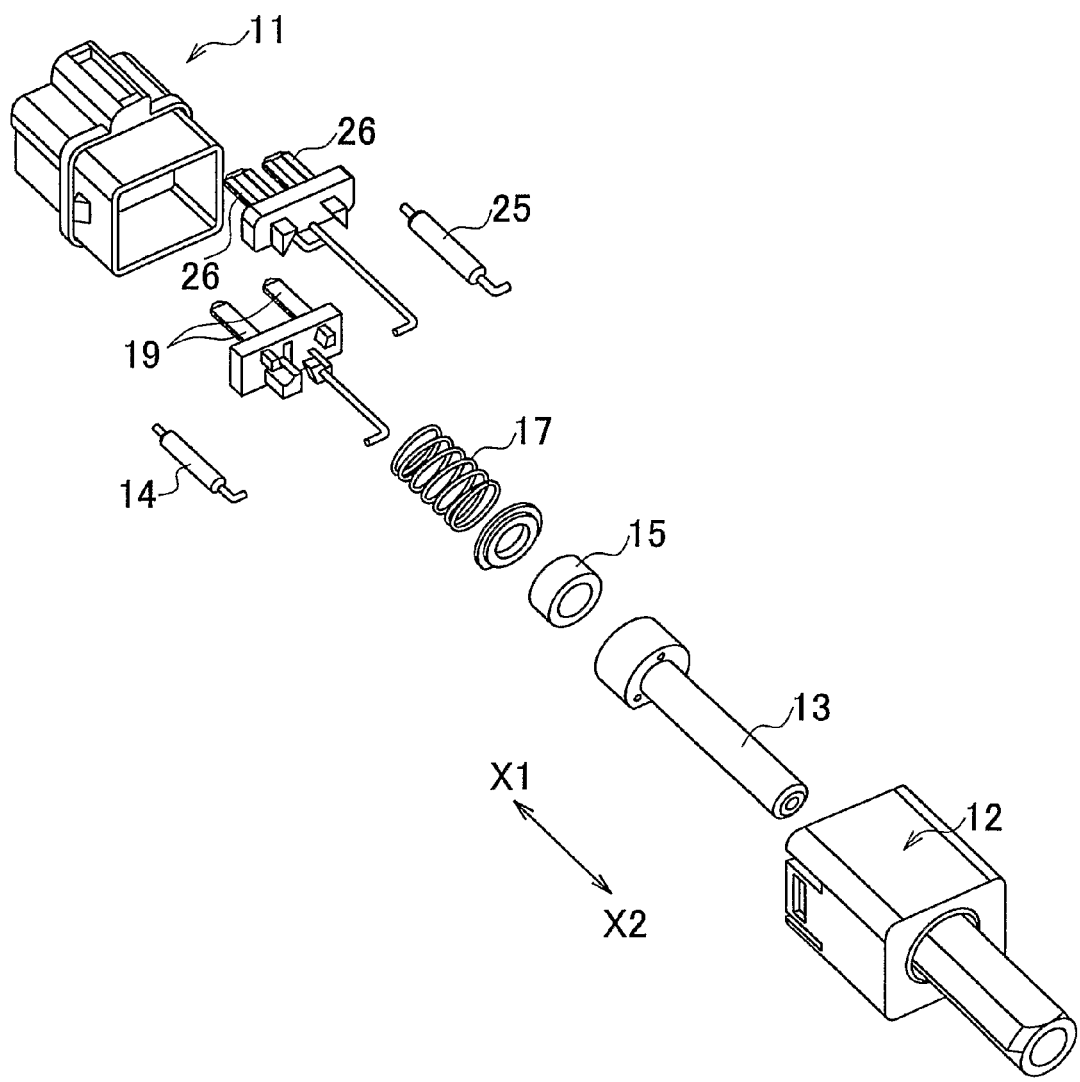
FIG. 15 is an exploded perspective view of the variation of the stop lamp switch according to the fifth embodiment of the present invention.

FIG. 14 to FIG. 15 show a stop lamp switch 10G according to a variation of the fifth embodiment of the present invention. The stop lamp switch 10G of this variation is similar to the stop lamp switch 10F of the fifth embodiment, switches the contacts of the reed switches 14, 25 on and off without using a blocking member.

The stop lamp switch 10G of this variation, however, differs from the stop lamp switch 10F of the fifth embodiment in that it uses a ring-shaped magnet as the magnet 15, and in that the reed switch 25 extends in the movement direction of the actuating shaft 13 (X1 and X2 directions).

By disposing the reed switch 25 to extend in the X1 and X2 directions as in this embodiment, the reed switch 14 and the reed switch 25 are substantially parallel. The contact position of the reed switch 14 and the contact position of the reed switch 25 are offset in the X1 and X2 directions. Specifically, the contact position of the reed switch 14 (position at which the magnetic field switches the switch on and off) is offset by a prescribed amount in the X2 direction from the contact position of the reed switch 25.

In this variation as noted above, a ring-shaped magnet 15 is used, and the reed switch 14 is disposed to the inside of this ring-shaped magnet 15, with the reed switch 25 disposed to the outside of the ring-shaped magnet 15. Because the ring-shaped magnet 15 is mounted to the actuating shaft 13, and the reed switches 14, 25 are fixed to the case 11, by the actuating shaft 13 moving in the X1 and X2 directions, the magnet 15 moves in the X1 and X2 directions relative to the reed switches 14, 25.

When the brake pedal is not operating, the actuating shaft 13 is moved in the X1 direction, as shown in FIG. 14A, and the ring-shaped magnet 15 approaches the contacts of the reed switch 25. The result is that the magnetic field of the ring-shaped magnet 15 acts on the contacts of the reed switch 25, so that the reed switch 25 goes into the on (closed) condition. When this occurs, because the contacts of the reed switch 14 are offset from the contacts of the reed switch 25, the magnetic field of the ring-shaped magnet 15 does not act on the contacts of the reed switch 14, so that the reed switch 14 is in the off (open) condition.

On the other hand, when the brake pedal is operated, the actuating shaft 13 is moved in the X2 direction, as shown in FIG. 14B, the ring-shaped magnet 15 approaches the contacts of the reed switch 14. The result is that the magnetic field of the ring-shaped magnet 15 acts on the contacts of the reed switch 14, so that the reed switch 14 is closed. When this occurs, because the contacts of the reed switch 25 are offset from the contacts of the reed switch 14, the magnetic field of the ring-shaped magnet 15 does not act on the contacts of the reed switch 25, so that the reed switch 25 is in the off (open) condition.

As noted above, the stop lamp switch 10G of this variation, similar to the stop lamp switch 10F of the fifth embodiment, may switch two reed switches 14, 25 on and off with a single magnet, without using a blocking member. It is therefore possible to reduce the number of parts compared to the other embodiments, to facilitate assembly, and to achieve compactness.

In this variation, because the magnet 15 is ring-shaped and the reed switch 14 is disposed inside the ring-shaped magnet 15 and the reed switch 25 is disposed outside the ring-shaped magnet 15, it is possible to use a compact magnet 15 to have a magnetic field act on each of the reed switches 14, 25, thereby making it possible to achieve compactness in the stop lamp switch 10G, while achieving reliable switching operation.

The on/off timing of the reed switch 14 accompanying movement of the actuating shaft 13 and the on/off timing of the reed switch 25 accompanying movement of the actuating shaft 13 may be varied by adjusting the contact positions of the reed switch 14 and the reed switch 25 within the case 11 and the housing 12. In particular, if the reed switch 14 and the reed switch 25 are disposed in parallel, it is possible to perform this adjustment for each of the reed switch 14 and the reed switch 25.

In this variation as well, the reed switch 14 is inserted inside the actuating shaft 13. For this reason, it is possible to set the contact position of the reed switch 14 without regard to the movement region of the actuating shaft 13, and therefore possible to increase the degree of freedom of setting the on/off timing of the reed switches 14, 25.

A variation of the embodiment of the present invention will now be described.

FIG. 16A and 16B show a stop lamp switch 10H according to a variation of the fifth embodiment of the present invention. The stop lamp switch 10H is similar to the stop lamp switch 10G. However, stop lamp switch 10H shows two reed switches 14A and 14B disposed to the inside of the ring-shaped magnet 15, with the reed switch 25 disposed to the outside of the ring-shaped magnet 15. The contacts of the reed switch 25 are offset from the contacts of reed switches 14A and 14B.

Although each of the foregoing examples show the use of one or two reed switches, any number of reed switches may be used as appropriate.

According to the present invention, by using a reed switch and operating the contacts in a non-contacting manner, it is possible to eliminate moving parts in a sealing part and prevent damage to the sealing part. Because the contacts of the reed switch are disposed in a glass tube, the interior of which is either a vacuum or filled with an inert gas, there is no intrusion of impurities into the glass tube.

The invention claimed is:

1. A switch suitable for a stop lamp, comprising:
   an enclosure;
   a first reed switch and a second reed switch, disposed in the enclosure;
   an actuating shaft that is movable along an axial direction of the enclosure; and
   a ring-shaped magnet, disposed on the actuating shaft, the first reed switch being disposed inside the ring-shaped magnet and the second reed switch being disposed outside the ring-shaped magnet, wherein a magnetic field of the ring-shaped magnet opens and closes contacts of the first and second reed switches and the ring-shaped magnet moves with the movement of the actuating shaft, between a first position, at which a magnetic field is not applied to the first reed switch, and a second position, at which the magnetic field is applied to the first reed switch.

2. The switch according to claim 1, wherein multiple first reed switches are provided at locations where the magnetic field of the ring-shaped magnet reaches.

3. The switch according to claim 1,
   wherein, when the ring-shaped magnet is at the first position, a magnetic field of the ring-shaped magnet is applied to the second reed switch by the ring-shaped magnet and wherein when the ring-shaped magnet is at the second position, a magnetic field of the ring-shaped magnet is not applied to the second reed switch.

4. The switch according to claim 3, wherein a contact position of the first reed switch is offset in the axial direction of the actuating shaft relative to a contact position of the second reed switch.

5. The switch according to claim 1, wherein the actuating shaft covers the first reed switch.

6. The switch according to claim 1, wherein a housing space is formed in the actuating shaft, and wherein the first reed switch is insertable within the housing space.

7. The switch according to claim 1, wherein the first reed switch is elongated and extends in a parallel direction relative to the axial direction of the actuating shaft.

8. The switch according to claim 1, wherein the second reed switch is elongated and extends in a perpendicular direction relative to the axial direction of the actuating shaft.

9. The switch according to claim 1, wherein the reed switch disposed inside the ring-shaped magnet is switched on and off to light and extinguish the stop lamp.

10. The switch according to claim 1, wherein the reed switch disposed inside the ring-shaped magnet is supported by a holding member that extends from a connector terminal.

\* \* \* \* \*